(12) United States Patent
Nelson et al.

(10) Patent No.: US 12,067,563 B2
(45) Date of Patent: Aug. 20, 2024

(54) SYSTEM FOR COLLECTING CUSTOMER RATINGS FROM A PIN ENTRY DEVICE

(71) Applicant: TRURATING LIMITED, St Albans (GB)

(72) Inventors: Georgina Nelson, London (GB); Peter Salmon, Haslemere (GB)

(73) Assignee: TRURATING LIMITED, St. Albans (GB)

( * ) Notice: Subject to any disclaimer, the term of this patent is extended or adjusted under 35 U.S.C. 154(b) by 866 days.

(21) Appl. No.: 15/523,892

(22) PCT Filed: Nov. 2, 2015

(86) PCT No.: PCT/GB2015/053293
§ 371 (c)(1),
(2) Date: May 2, 2017

(87) PCT Pub. No.: WO2016/071679
PCT Pub. Date: May 12, 2016

(65) Prior Publication Data
US 2017/0330189 A1    Nov. 16, 2017

(30) Foreign Application Priority Data
Nov. 3, 2014 (GB) ...................... 1419546

(51) Int. Cl.
*G06Q 20/40* (2012.01)
*G06Q 20/20* (2012.01)
(Continued)

(52) U.S. Cl.
CPC ......... *G06Q 20/4012* (2013.01); *G06Q 20/20* (2013.01); *G06Q 20/202* (2013.01);
(Continued)

(58) Field of Classification Search
CPC ............. G06Q 20/4012; G06Q 20/202; G06Q 20/206; G06Q 20/208; G06Q 20/4014;
(Continued)

(56) References Cited

U.S. PATENT DOCUMENTS

2004/0177002 A1* 9/2004 Abelow ............. G06Q 10/0639
705/14.19
2005/0228718 A1* 10/2005 Austin ............... G06Q 30/0267
705/14.66
(Continued)

FOREIGN PATENT DOCUMENTS

GB     2 456 346 A      7/2009
GB     2456346 A  *     7/2009 ............. G06Q 20/20
(Continued)

OTHER PUBLICATIONS

Payments Forum, "Optimizing Transaction Speed at the POS", Oct. 2017, https://www.uspaymentsforum.org/wp-content/uploads/2016/09/Optimizing-Txn-Speed-WP-FINALV3-October-2017.pdf (Year: 2017).*

(Continued)

*Primary Examiner* — Allen C Chein
*Assistant Examiner* — Aaron N Tutor
(74) *Attorney, Agent, or Firm* — Cowan, Liebowitz & Latman, P.C.; Mark Montague; Daniel Basov

(57) ABSTRACT

The present invention provides a system operable to collect customer ratings during a transaction using an electronic point of sale system comprising a computer programmed to effect operation of the electronic point of sale system. The system includes a POS module programmed to manage operation of a scanner, a PIN entry device; a payment application operable to manage the PIN entry device; a POS proxy module; a payment application plug-in operable in conjunction with the payment application; a scanner pass- (Continued)

through driver operable to pass scanner signals between the POS module and the scanner while collecting information from the scanner signals and sending that information to the POS proxy module; wherein the POS proxy module is programmed to cause collection of a customer rating during the transaction by using the information received from the scanner pass-through driver to initiate a customer rating collection session, to send a customer rating initiation signal to the payment application plug-in which in turn causes the PIN entry device to prompt the customer to enter a rating.

31 Claims, 5 Drawing Sheets

(51) Int. Cl.
G06Q 30/0203 (2023.01)
G06Q 30/0282 (2023.01)
G07G 1/00 (2006.01)

(52) U.S. Cl.
CPC ....... *G06Q 20/208* (2013.01); *G06Q 20/4014* (2013.01); *G06Q 30/0203* (2013.01); *G07G 1/0009* (2013.01); *G07G 1/0027* (2013.01); *G06Q 20/209* (2013.01); *G06Q 30/0282* (2013.01)

(58) Field of Classification Search
CPC ............. G06Q 30/0203; G06Q 20/209; G06Q 30/0282; G06Q 20/20; G06Q 30/0201; G07G 1/0009; G07G 1/0027
See application file for complete search history.

(56) References Cited

U.S. PATENT DOCUMENTS

| | | | |
|---|---|---|---|
| 2010/0039666 A1* | 2/2010 | Tsukada | G06Q 20/202 358/1.15 |
| 2012/0116846 A1 | 5/2012 | Levy et al. | |
| 2014/0337098 A1* | 11/2014 | Ganesh | G06Q 30/0203 705/7.32 |
| 2016/0253686 A1* | 9/2016 | Roberts | G06Q 30/0201 705/7.32 |

FOREIGN PATENT DOCUMENTS

| | | | | |
|---|---|---|---|---|
| WO | 2013/008041 A1 | 1/2013 | | |
| WO | WO-2013008041 A1 * | 1/2013 | ........... | G06Q 20/202 |

OTHER PUBLICATIONS

International Search Report of the corresponding International Application, PCT/GB2015/053293 dated Feb. 17, 2016.

* cited by examiner

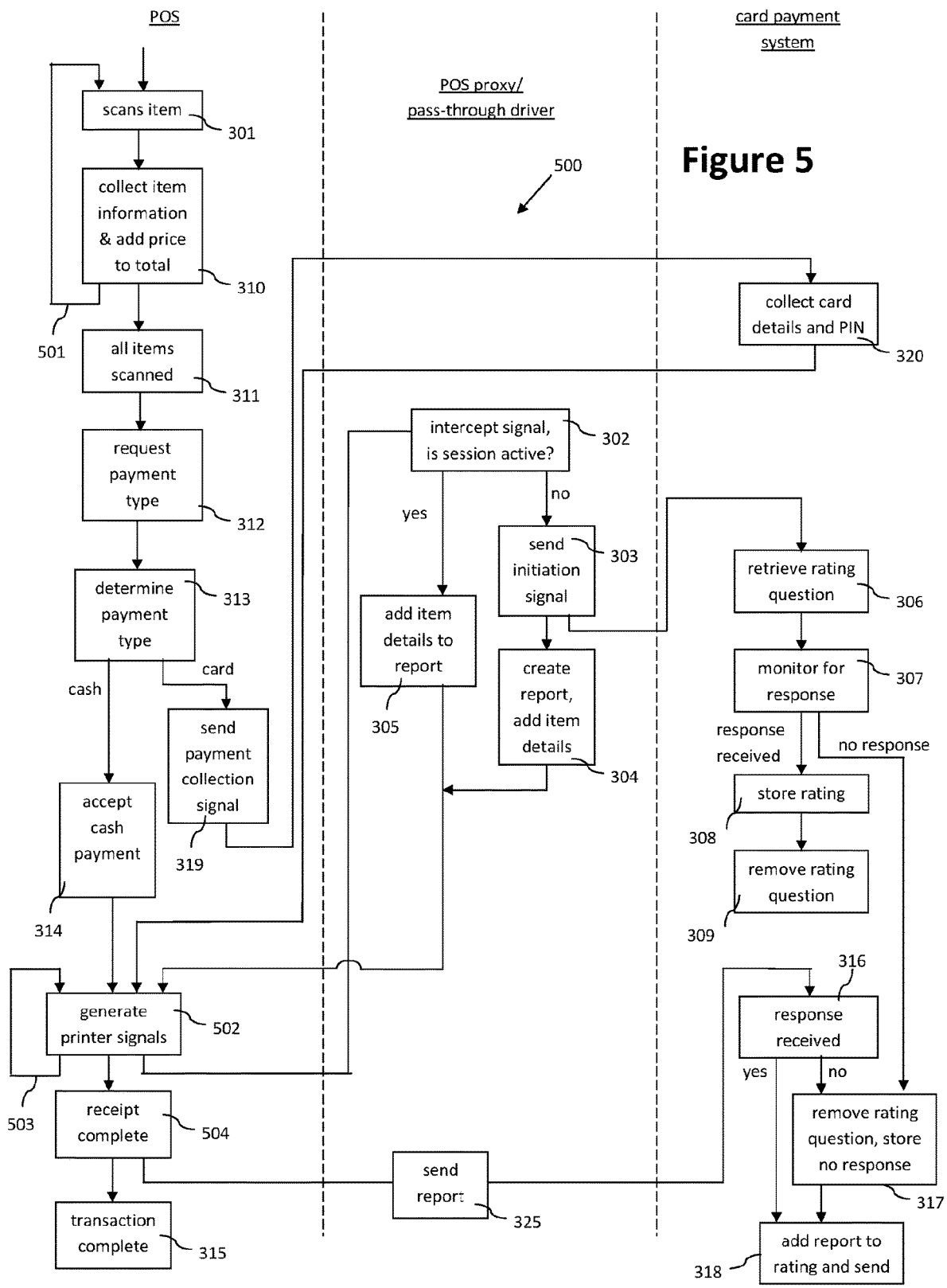

SYSTEM FOR COLLECTING CUSTOMER RATINGS FROM A PIN ENTRY DEVICE

CROSS REFERENCE TO RELATED APPLICATIONS

This is a U.S. national stage of application No. PCT/GB2015/053293, filed on Nov. 2, 2015. Priority under 35 U.S.C. § 119(a) and 35 U.S.C. § 365(b) is claimed from Great Britain Patent Application No. 1419546.5, filed on Nov. 3, 2014, the disclosure of which is incorporated herein by reference.

FIELD OF THE INVENTION

The present invention relates to a system for collecting customer ratings from a PIN entry device during a transaction.

BACKGROUND TO THE INVENTION

It is desirable for businesses to receive feedback from customers, for example to allow it to improve the goods and/or service it offers. The internet enables customers both to provide ratings and also to compare businesses based on the ratings that they have received. For example, online review websites enable customers to provide ratings and feedback on services such as hotel stays, restaurant dining, tradesmen's services such as builders, and quality of goods.

However, ratings gathered after an event or transaction is far less accurate than ratings gathered at the point of sale. Also, a very small percentage of customers actually engage in the feedback process, which means that results are never truly representative of the customer base. With review websites, a further problem lies in that the credibility of the reviews provided by customers cannot be validated. There is therefore a need for rating systems which encourage more accurate feedback from a greater number of customers.

British patent application GB 2,456,346 proposes the use of a PIN (personal identification number) entry device to collect ratings. PIN entry devices are the preferred method of authorising card transactions in many countries (e.g. Europay, Mastercard and Visa card transactions). For example, in many countries, the usual method to effect payment at a point of sale (POS) is the chip-and-pin system where a customer must present their card to the PIN entry device and then use a numeric keypad to enter their PIN into the PIN entry device. As the customer must physically interact with the PIN entry device, this patent application proposes using this opportunity to obtain a rating from a customer. For example, after a PIN has been entered, the PIN entry device may be used to ask a question about the service provided by the business which led to the transaction. Where a rating is provided, this sent to a separate server where ratings are gathered.

International patent application WO 2013/008041 proposes modifying the POS application running on an electronic POS system to extract transaction data from messages passing through the electronic POS system. It does this by placing virtual drivers between the POS system and physical devices such as scanners and printers to intercept messages and extract data from the messages.

There is a need for improved systems and methods which enable a customer to provide ratings at a point of sale using a PIN entry device. In particular, there is a need for a system for collecting customer ratings that is integrated into a POS system and that may provide additional information regarding the transaction.

SUMMARY OF THE INVENTION

According to a first aspect, the present invention resides in a system operable to collect customer ratings during a transaction, for example in a shop or a restaurant. The system includes an electronic point of sale (POS) system. The electronic POS system may provide a location for a sales assistant to effect a transaction, for example to log the merchandise to be purchased with the POS system or it may provide a self-service location where the customer may, for example, scan the merchandise and effect the transaction. The merchandise may comprise goods or services.

The electronic POS system comprises peripheral devices including a scanner operable to read encoded information relating to merchandise to be purchased as part of the transaction. For example, the encoded information may be a bar code, a QR code, a radio frequency signal, a near-field communication signal or any other type of encoded information that provides information relating to the merchandise. The information may include a price of the merchandise and/or a description of the merchandise.

The electronic POS system also comprises a computer programmed to effect operation of the electronic point of sale. The computer includes a POS module programmed to manage operation of the scanner and a scanner driver operable to convey scanner signals between the POS module and the scanner. The scanner signals include merchandise signals providing information of merchandise just scanned. For example, the scanner may be used to scan the encoded information such as a bar code, and to send the merchandise signal that corresponds to the encoded information to the scanner driver. The scanner driver may then pass that merchandise signal to the POS module, for example after converting the signal format or signal levels into a form suitable for the POS module. Also, the scanner driver may receive signals from the POS module, for example an initialisation signal, and to convert and pass these signals to the scanner to effect operation of the scanner.

A PIN entry device is also provided that is operable in association with the electronic POS system to arrange a card payment for the transaction. While the PIN entry device may be integrated as part of the electronic POS system, the PIN entry device may also work in conjunction with the electronic POS system. In this latter arrangement, the electronic POS system communicates with a payment application that in turn communicates with the POS module. The payment application is operable to manage operation of the PIN entry device, and may be provided on the PIN entry device itself, as part of the electronic POS system (for example, as part of the computer) or as part of a separate computer such as a payment server to which the PIN entry device is connected.

The payment application is programmed to receive a payment collection signal from the POS module, to operate the PIN entry device to collect card details including a PIN from the customer to effect payment of the transaction. This may be done by the payment application using a display of the PIN entry device to prompt the customer to insert their payment card into the PIN entry device, or to tap their card on the PIN entry device, the payment application reading the card details, prompting the customer to enter their PIN, and then reading the PIN. The payment application may then communicate with a remote payment server to validate the payment. The payment application provides a payment confirmation signal to the POS module to confirm whether or not a payment was successfully made using the PIN entry device.

The system further comprises a POS proxy module and a payment application plug-in operable in conjunction with the payment application. The POS proxy module may reside in the computer or may be provided as part of a separate computer. The payment application plug-in preferably resides with the payment application.

There is also provided a scanner pass-through driver operable to pass the scanner signals between the POS module and the scanner while collecting information from the scanner signals and sending that information to the POS proxy module. Preferably, the scanner pass-through driver does not modify the signals as they pass between the POS module and the scanner. The scanner pass-through driver merely receives the signals, copies them and sends the signals on their way. The scanner pass-through driver may sit between the POS module and the scanner driver, or may sit between the scanner driver and the scanner. The scanner pass-through driver may merely copy the scanner signals and forward them to the POS proxy module for the POS proxy module to extract the information. Alternatively, the scanner pass-through driver may extract the information and pass the information to the POS proxy module.

The POS proxy module is programmed to collect a customer rating during a transaction by using the information received from the scanner pass-through driver to initiate a customer rating collection session. The session is initiated by sending a customer rating initiation signal to the payment application plug-in. The payment application plug-in is programmed to cause the PIN entry device to display a question on the PIN entry device that prompts the customer to enter a rating. The PIN entry device then collects the rating entered by the customer and passes the rating to the payment application plug-in. The payment application plug-in may then provide the rating to a third party, such as a remote ratings server. The ratings server may collate the ratings provided, perform analysis and present the results.

The system described above advantageously integrates a means of collecting customer ratings using a PIN entry device into an electronic POS system. In particular, the arrangement of the POS proxy module, the scanner pass-through driver and the payment application plug-in means that the system may be implemented without requiring any adaptation of the POS module, in contrast to the prior art. For example, there is no need for the POS proxy module to communicate directly with the POS module. Hence, the system may not comprise any direct connection from the POS module to the POS proxy module. In addition, the combination of the POS proxy module and the payment applications plug-in again avoids any interference with the POS proxy as this combination allows information to be extracted from the PIN entry device without interfering with the POS module and how it works. Hence, the components added to allow customer ratings to be collected are transparent to the POS module and to the electronic POS system in general. Therefore, no changes to the POS module or electronic POS system are required. Additional standalone components like the POS proxy module and scanner pass-through driver are added. A plug-in is provided for the payment application.

Furthermore, the flexible system described above provides a simple and convenient way of acquiring other information relating to the transaction that may be appended to the rating provided by the customer. For example, the POS proxy module may be programmed to collate information collected from the merchandise signals by the scanner pass-through driver into a transaction report. Some or all of the information received may be formatted into a report on the transaction. The report may provide a list of the merchandise purchased or may place the merchandise purchased into categories, for example according to type or value. Optionally, the POS proxy module and the payment application plug-in are programmed to share and combine the rating and the transaction report. The combined rating and report may then be used together. In one embodiment, the POS proxy module is programmed to send the transaction report to the payment application plug-in. The application payment plug-in then combines the rating and the transaction report. The payment application plug-in may send the combined rating and transaction report to a remote ratings server.

As will be appreciated, the electronic POS system may comprise further peripheral devices, such as a display, a printer and a cash drawer. These devices may also be used advantageously according to embodiments of the present invention.

For example, the electronic point of sale may further comprise a printer operable to print receipts relating to the transaction. The POS module may be programmed to manage operation of the scanner and the printer. The computer may include a printer driver operable to convey printer signals between the POS module and the printer. The printer signals may be signals that initialise the printer, or may be signals to instruct the printer to print something, for example a line of text or a complete receipt. The printer signals may include a transaction summary signal, for example for use in printing the receipt to show all merchandise items purchased and the value of each. The system may comprise a printer pass-through driver operable to pass the printer signals between the POS module and the printer. The printer pass-through driver may also pass the printer signals to the POS proxy module. For example, the printer pass-through driver may make a copy of the printer signals and send these copies to the POS proxy module. The printer pass-through driver may monitor the printer signals and send another signal to the POS proxy module, for example a simple signal merely to indicate that the printer is coming online.

The POS proxy module may be programmed to generate a rating confirmation message relating to whether or not a rating was provided, and to send the rating confirmation message to the printer pass-through driver. The printer pass-through driver may be operable to forward the rating confirmation message to the printer such that the rating confirmation message is appended to a receipt printed by the printer in respect of the transaction. If a rating was provided, the message may say "thank you for providing a rating". If a rating was not provided, the message may say "we are sorry you did not provide a rating". The message may include a web address, optionally encoded as a QR code. For example, where a rating was provided, a web address may be provided to allow the customer to claim a prize. Alternatively, where a rating was not provided, a message may be provided saying "to provide a rating, follow the link below" and a web address may be provided to allow the customer to provide a rating at a later time.

Optionally, the POS proxy module is further programmed to collect the customer rating during the transaction by using the printer signal received from the printer pass-through driver to initiate the customer rating collection session. For example, this may be used in conjunction with using the scanner signals to provide a safeguard. For example, should the scanner not be used or the initiation fails, the rating may still be initiated later during the transaction, for example when the printer is first used. Typically the printer is used to print a receipt at the end of the transaction, and this may be used to trigger the ratings collection if not triggered before.

Where the POS proxy module is programmed to collate the information received from the scanner pass-through driver into a transaction report and the POS proxy module and the payment application plug-in are programmed to share and combine the rating and the transaction report, the printer pass-through driver may be programmed to collect information from the transaction summary signal and to send that information to the POS proxy module. The POS proxy module may be programmed to add information received from the printer pass-through driver into the transaction report. This provides another convenient way to collect information to add to the customer rating. When printing the receipt, the POS module sends a list of the merchandise purchased and the value of each item to the printer for adding to the receipt being printed. The printer pass-through driver may be used effectively to extract this information for inclusion in the transaction report.

Optionally, the electronic POS system further comprises a display operable to display information relating to the transaction to a customer. The POS module may be programmed to manage operation of the scanner and the display, and the computer may include a display driver operable to convey display signals between the POS module and the display. The display signals may include information of merchandise that has been scanned. The system may comprise a display pass-through driver operable to pass the display signals between the POS module and the display while also passing the display signals to the POS proxy module. For example, the display pass-through driver may make a copy of the display signals and send these copies to the POS proxy module. The display pass-through driver may monitor the display signals and send another signal to the POS proxy module, for example a simple signal merely to indicate that the display is being updated.

The POS proxy module may be further programmed to collect the customer rating during the transaction by using the display signal received from the display pass-through driver to initiate the customer rating collection session. For example, this may be used in conjunction with using the scanner signals and, optionally, the printer signals to provide a safeguard. For example, the rating may be initiated during the transaction when the display if first updated. Typically the display is used to display each item of merchandise just scanned and so the display signals may be used to trigger the ratings collection in much the same way as the scanner signals.

Where the POS proxy module is programmed to collate the information received from the scanner pass-through driver into a transaction report and the POS proxy module and the payment application plug-in are programmed to share and combine the rating and the transaction report, the POS proxy module may be programmed to collect information of merchandise that has been scanned from the display signal, and to add that information into the transaction report. This provides another easy way to collect information to add to the customer rating. Details relating to each item of merchandise purchased are sent to the display, such as a description of the merchandise and its value, and the display pass-through driver may effectively be used to extract this information for inclusion in the transaction report.

Optionally, the electronic point of sale further comprises a cash drawer providing secure storage of money. The POS module may be programmed to manage operation of the scanner and the cash drawer, and the computer may include a cash drawer driver operable to convey cash drawer signals between the POS module and the cash drawer to open the cash drawer. The system may comprise a cash drawer pass-through driver operable to pass the cash drawer signals between the POS module and the cash drawer while also passing the cash drawer signals to the POS proxy module. For example, the cash drawer pass-through driver may make a copy of the cash drawer signals and send these copies to the POS proxy module. The cash drawer pass-through driver may monitor the cash drawer signals and send another signal to the POS proxy module, for example a simple signal merely to indicate that the cash drawer is being opened. The POS proxy module may be further programmed to collect the customer rating during the transaction by using the cash drawer signal received from the cash drawer pass-through driver to initiate the customer rating collection session. For example, this may be used in conjunction with using the scanner signals and, optionally, the printer signals and/or display signals to provide a safeguard. For example, the rating may be initiated during the transaction when the cash drawer is opened. Typically the cash drawer is opened at the end of the transaction, and so this provides a final failsafe to prompt a customer to enter a rating.

Optionally, the payment application plug-in is programmed to remove the question from the PIN entry device once the customer has provided a rating. The payment application plug-in may also provide a signal to the POS proxy module to confirm that a rating has been provided.

The payment application plug-in may be programmed to remove the question from the PIN entry device once the payment application receives the payment collection signal from the POS module. The payment application plug-in may also provide a signal to the POS proxy module to indicate whether or not a rating has not been provided.

The ideas set forth in the preceding pair of paragraphs may be combined. That is, the payment application plug-in may be programmed to remove the question from the PIN entry device once the customer has provided a rating and to provide a signal to the POS proxy module to confirm that a rating has been provided, and to remove the question from the PIN entry device once the payment application receives the payment collection signal from the POS module and to provide a signal to the POS proxy module to indicate that a rating has not been provided.

As will be appreciated, all the optional features above conform to the advantageous arrangement of the system where there is no need for the POS proxy module to communicate directly with the POS module. A series of pass-through drivers are employed to obtain information relating to transactions and to trigger the ratings collection process. All the pass-through drivers communicate with the POS proxy module, and the POS proxy module collates the transaction information to be used with the customer rating. Moreover, a flexible system is described where transaction information may be obtained from many different sources, for example the scanner signals or the display signals provided each time a merchandise item is scanned or from the printer signals that provide a summary of the transaction when the transaction is complete. These signals may be used either to trigger the rating collection or to provide the transaction information to append to the rating. Moreover, the system may be applied to POS systems where one or more of peripheral devices are omitted.

From a second aspect, the present invention resides in a method of collecting customer ratings during transactions conducted at a point of sale. The method comprises scanning merchandise items using a scanner forming part of an electronic point of sale system. The scanner provides a POS module of the electronic point of sale system with a scanner signal representative of each scanned item. The scanner may be connected to the POS module via a scanner driver. The scanner driver may receive a signal from the scanner and convert the signal into a corresponding signal but having the right form to be received and used by the POS module. A scanner pass-through driver intercepts the scanner signals and forwards each scanner signal or a copy thereof to the POS module and forwards each scanner signal or a copy thereof to a POS proxy module. Where a scanner driver is present, the scanner pass-through driver may operate on either side of the scanner driver. Namely, the scanner pass-through driver may intercept the signals travelling between the scanner and the scanner driver or may intercept the signals travelling between the scanner driver and the POS module.

Upon receiving a scanner signal or a copy thereof from the scanner pass-through driver, the POS proxy module initiates collection of a customer rating by sending a customer rating initiation signal to a payment application plug-in. The payment application plug-in causes a PIN entry device to display a question prompting the customer to enter a rating. The PIN entry device operates under the control of a payment application, for example to collect details including a PIN to allow a card payment to be made. The payment application plug-in collects the rating when entered by the customer. Once the rating has been provided, the payment application plug-in may remove the question from the PIN entry device.

The payment application plug-in may send the rating to a remote server, for example for further analysis and/or presentation.

Optionally, the POS module sends a payment collection signal to the payment application, and the payment application may control the PIN entry device to collect information necessary to complete a card payment. For example the PIN entry device may prompt the customer to insert a payment card or tap or present a payment card so as to effect a contactless transaction. The PIN entry device may then prompt the customer to enter their PIN. The payment application may cause the question prompting the customer to enter a rating to be removed from the PIN entry device, if the question remains on the PIN entry device, before prompting the customer to provide the information necessary to complete a card payment.

Upon receiving a scanner signal or a copy thereof from the scanner pass-through driver, the POS proxy module may determine whether or not a customer rating session is active and, if not, may initiate collection of a customer rating by sending the customer rating initiation signal to the payment application plug-in. During a transaction, multiple merchandise items are likely to be scanned. Preferably, the first item to be scanned triggers the customer rating collection session. Each subsequent item scanned need not trigger a new customer rating session.

Optionally, the method may further comprise the POS proxy module collating information regarding the merchandise items scanned from the scanner signals or copies thereof received into a transaction report. The rating and the transaction report may be combined. For example, the POS proxy module may forward the transaction report to the payment application plug-in and the payment application plug-in may combine the rating and the transaction report. The payment application plug-in may then forward the combined rating and transaction report to a remote server.

The method may comprise the POS module sending printer signals to a printer of the electronic point of sale system, intercepting the printer signals with a printer pass-through driver, and forwarding each printer signal or a copy thereof to the POS proxy module. The method may comprise the POS proxy module generating a rating confirmation message relating to whether or not a rating was provided and sending the rating confirmation message to the printer pass-through driver. The printer pass-through driver may forward the rating confirmation message to the printer such that the rating confirmation message is appended to a receipt printed by the printer in respect of the transaction.

Optionally, the method comprises the POS proxy module causing collection of the customer rating during the transaction by using the printer signal or the copy thereof received from the printer pass-through driver to initiate the customer rating collection session. The method may comprise the POS proxy module collating information regarding the merchandise items scanned from the scanner signals or copies thereof received into a transaction report, the printer pass-through driver collecting information regarding the merchandise items from a transaction summary signal sent to the printer for generating a receipt and sending that information to the POS proxy module, the POS proxy module adding information received from the printer pass-through driver into the transaction report, and combining the rating and the transaction report.

The method may comprise the POS proxy module collating information regarding the merchandise items scanned from the scanner signals or copies thereof received into a transaction report, the display pass-through driver collecting information regarding the merchandise items from display signals sent to the display for displaying information relating to the merchandise item just scanned and sending that information to the POS proxy module, the POS proxy module adding information received from the display pass-through driver into the transaction report, and combining the rating and the transaction report.

Optionally, the method comprises the POS module sending cash drawer signals to a cash drawer of the electronic point of sale system, intercepting the cash drawer signals with a cash drawer pass-through driver, and forwarding each cash drawer signal or a copy thereof to the POS proxy module, and the POS proxy module causing collection of the customer rating during the transaction by using the cash drawer signal or the copy thereof received from the cash drawer pass-through driver to initiate the customer rating collection session.

As noted above in respect of the scanner pass-through driver, each peripheral device may driver connecting it to the POS module. Each driver may convert signals into the right form to be received and used by the POS module or the peripheral device. Each pass-through driver may operate on either side of its associated driver, as already explained above in respect of the scanner.

An advantage of the methods described above is that the POS proxy module need not communicate directly with the POS module. In fact, the POS module may operate in a completely standard and unaltered manner. In this sense, the addition of the pass-through drivers, the POS proxy module and the payment application plug-in is transparent to the POS module.

BRIEF DESCRIPTION OF THE DRAWINGS

In order that the present invention may be more readily understood, preferred embodiments will now be described, by way of example only, with reference to the accompanying drawings in which:

FIG. 5 is a schematic representation of a method of collecting customer ratings in accordance with a further embodiment of the present invention.

DETAILED DESCRIPTION OF THE INVENTION

Figure 1:
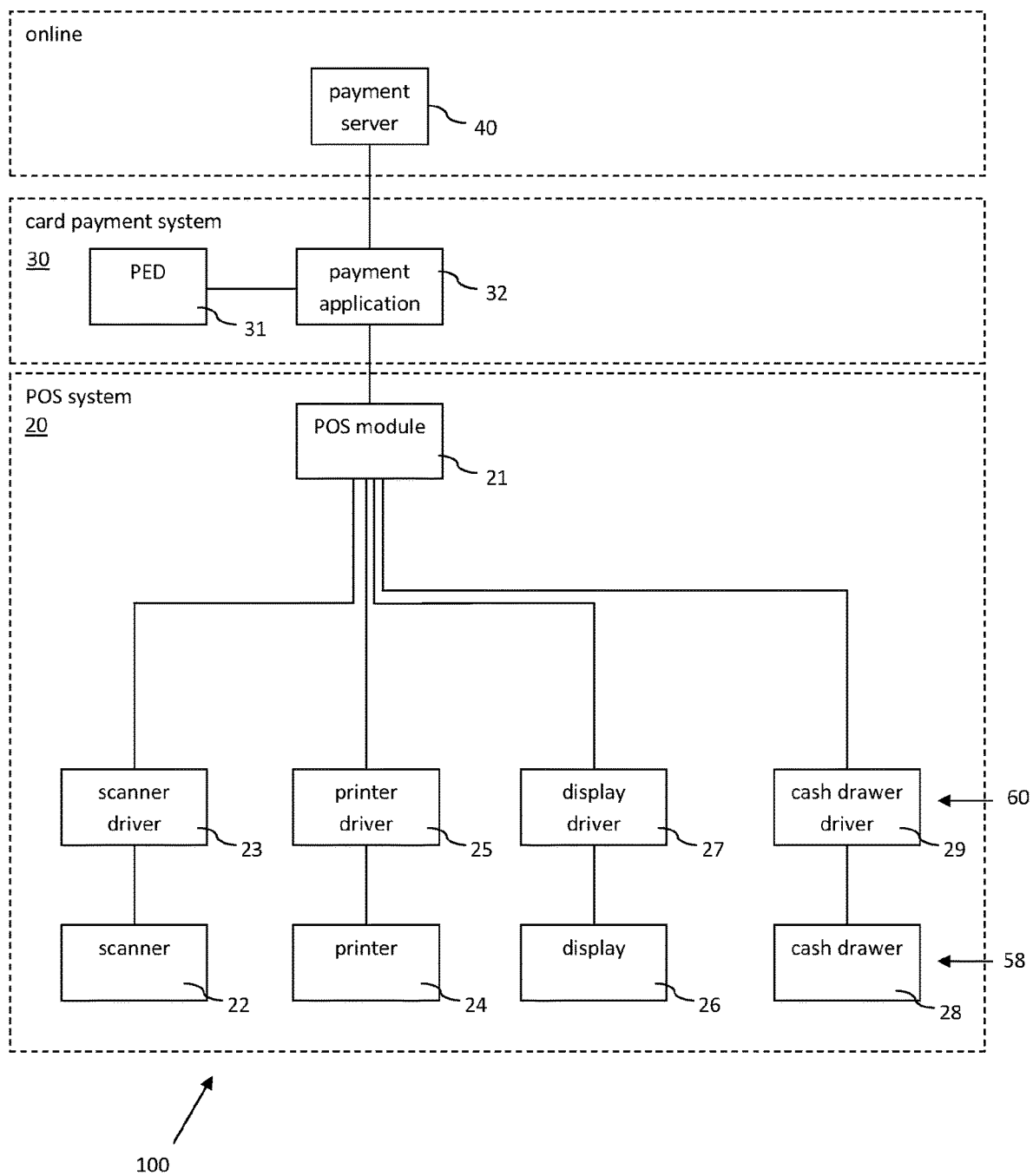
FIG. 1 is a schematic representation of a typical system for conducting transactions including an electronic POS system.

A standard system 10 for conducting transactions is shown in FIG. 1, like those commonly found in retail outlets like stores, restaurants, cinemas, petrol stations and so on. The system 10 comprises a POS system 20 such as a till connected to a card payment system 30 that is in turn connected to a payment server 40.

The POS system 20 operates under the management of a POS module 21, for example a software component resident on a computer such as a till. The POS system 20 comprises a number of peripheral devices 58, namely a scanner 22, a printer 24, a display 26 and a cash drawer 28.

The scanner 22 is an optical scanner operable to scan bar codes provided on merchandise items. As is well known, the bar code corresponds to information about the merchandise item including details of that item and its price. The scanned bar code is provided by the scanner 22 to the POS module 21. As is common in computer systems, the physical device is connected to the computer via a driver: in this case, the scanner 22 is connected to the POS module 21 via a scanner driver 23. The scanner driver 23 translates signals between the POS module 21 and the scanner 22 into the appropriate form to be understood by the recipient device. The POS module 21 receives the signals from the scanner 22 via the scanner driver 23, and extracts the required information. For example, the item cost is extracted and added to the transaction total, and the item details and price are extracted.

The display 26 is used to present information to the customer as the transaction is processed. The display 26 is connected to the POS module 21 via a display driver 27. Like the scanner driver 23, the display driver 27 translates signals between the POS module 21 and the display 26 into the appropriate form to be understood by the recipient device. The details of the merchandise items are displayed on the display 26. For example, as each item is scanned with the scanner 22, the POS module 21 may extract the information from the signal received from the scanner 22 as described above, and present the item details and price on the display 26 to the customer. At the end of the transaction, the display 26 may be used to display the transaction total to the customer. In addition to this information, the display 26 may present instructions to the customer. For example, at self-service tills, the display 26 may present instructions to scan the next item or present prompts for the customer to indicate that all items have been scanned and payment is now required.

The printer 25 is used to provide till receipts. The printer 25 is connected to the POS module 21 via a printer driver 25. Like the scanner driver 23, the printer driver 25 translates signals between the POS module 21 and the printer 24 into the appropriate form to be understood by the recipient device. The till receipts provide details of the merchandise items bought, the price of each, the total transaction cost and other details such as the location details (e.g. store name, restaurant name), any discounts applied, loyalty card details, and the date and time. The details provided on the till receipt printed by the printer 24 are obtained by the POS module 21 when the POS module 21 extracts details from the signals received from the scanner 22, as described above.

The cash drawer 28 contains cash and is normally kept locked shut, except when a cash transaction is completed and cash needs to be placed in the drawer 28, and perhaps change removed from the drawer 28. The cash drawer 28 is connected to the POS module via a cash drawer driver 29. Like the scanner driver 23, the cash drawer driver 29 translates signals between the POS module 21 and the cash drawer 28 into the appropriate form to be understood by the recipient device. For example, a signal may be sent by the POS module 21 to make the cash drawer 28 open. The POS module 21 may then wait for a confirmation signal from the cash drawer 28 to confirm that the cash drawer 28 has opened and has then been closed once more.

In addition to accepting cash payments, the POS system 20 may accept card payments. Therefore, the system 10 is provided with a card payment system 30. The card payment system 30 comprises a PIN entry device (PED) 31 that is connected to a payment application 32. The payment application 32 is connected to the POS module 21 and also to the payment server 40. In some arrangements, the payment application 32 resides with the POS module 32, i.e. as a computer program stored on the same computer. In other arrangements, the payment application 32 is provided on the PED 31. The payment application 32 monitors for a payment request signal provided by the POS module 21. The payment request signal is generated when a customer indicates that they wish to pay for the transaction using a card. The payment request signal also indicates the total transaction amount and details of the transaction.

Upon receiving the payment request signal from the POS module 21, the payment application 32 controls the PED 31 such that a display of the PED 31 displays the transaction total and prompts the customer to insert their payment card into the PED 31 or to tap their payment card on the PED 31. Inserting the card into the PED 31 or tapping the card on the PED 31 causes the PED 31 to read the card details. Once the card details have been acquired, the PED 31 prompts the customer to enter their PIN to verify the transaction. The PED 31 checks that the PIN is correct, and then sends the card details, the transaction amount and the transaction details to the payment server 40. The payment server 40 will then authorise or decline the transaction, for example by checking that the customer has enough credit in the account connected to the card. The payment server 40 returns a message to the payment application 32 to indicate whether the transaction was authorised or declined. The payment application 32 then causes the PED 31 to display a message indicating whether the transaction was authorised or declined and further instructions, such as remove the card where the transaction was authorised or insert an alternative card where the transaction was declined. The payment application 32 also passes a signal to the POS module 21 that indicates whether the transaction was authorised or declined.

Where the transaction was authorised, the POS module 21 will then cause the printer 24 to print a receipt by sending the required signals to provide all the information to be included on the receipt. The POS module 21 may also send a signal to the display to cause the display to show a message such as "please take your receipt".

Figure 2:
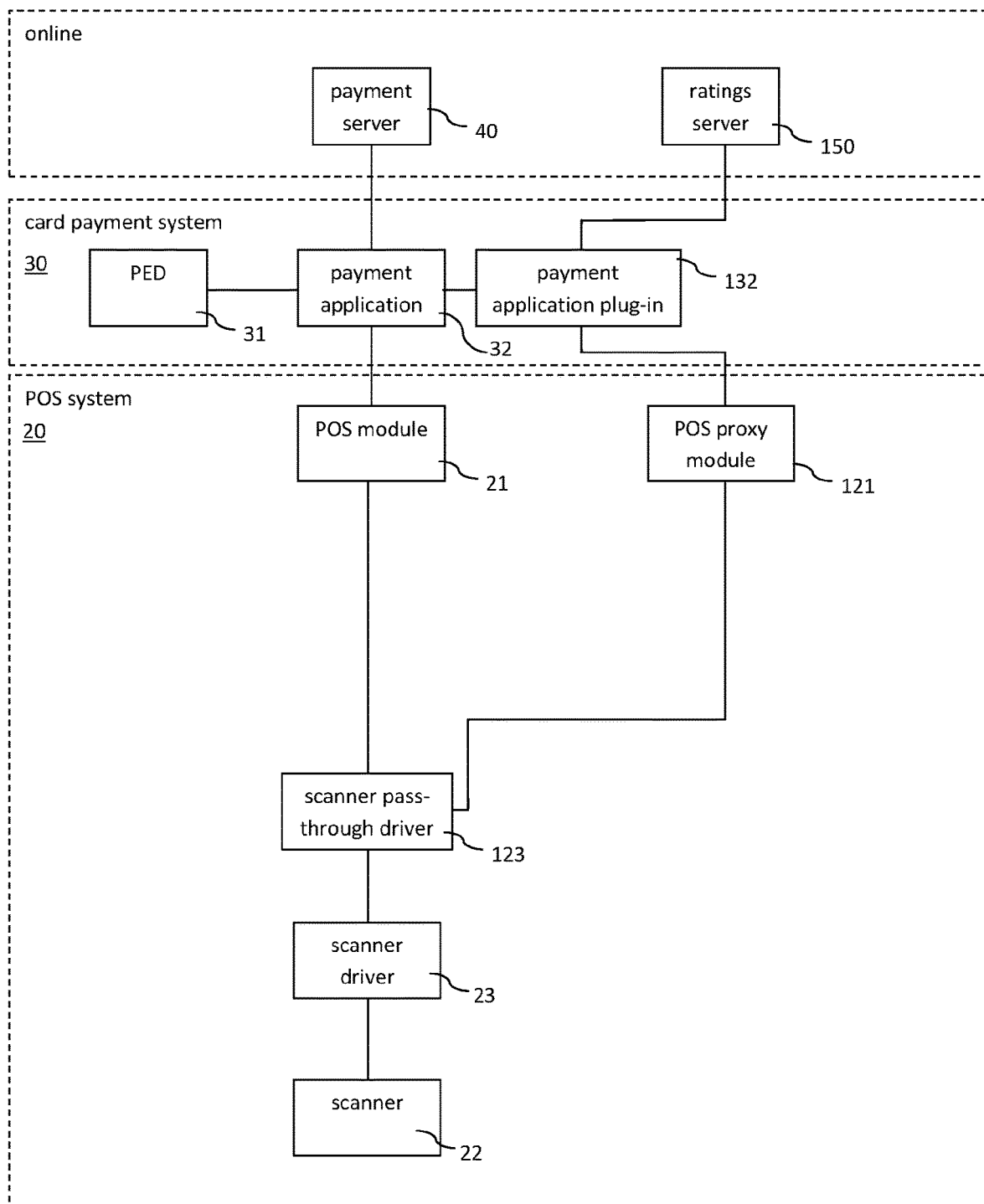
FIG. 2 is a schematic representation of a system operable to collect customer ratings during a transaction according to an embodiment of the present invention.

FIG. 2 corresponds to an embodiment of the present invention. The figure shows a system operable to gather customer ratings during a transaction as implemented in a basic form. Many of the features shown in FIG. 2 correspond to those shown in FIG. 1, and these features function in the same way. Thus, these features are identified using the same reference numerals and will not be described again. New features are assigned three digit reference numerals.

Thus, a system 100 is provided that comprises a POS system 20, a card payment system 30 and a payment server 40. In this basic form, the POS system 20 is shown to include a POS module and only a single peripheral device 58, namely a scanner 22 connected to the POS module 21 via a scanner driver 23. In addition to the POS module 21 of FIG. 1, a similar but separate POS proxy module 121 has been added. As can be seen from FIG. 2, there is no direct connection between the POS module 21 and the POS proxy module 121. The POS proxy module is connected to a scanner pass-through driver 123 that sits functionally between the POS module 21 and the scanner driver 23.

The scanner pass-through driver 123 receives signals from the POS module 21 that are directed to the scanner driver 23. The scanner pass-through driver 123 conveys these signals to the scanner driver unaltered such that the scanner pass-through driver 123 is effectively transparent to the scanner driver 23. However, the scanner pass-through driver 123 also copies the signals and sends a copy of the signals to the POS proxy module 121. Similarly, the scanner pass-through driver 123 also forwards signals from the scanner driver 23 to the POS module 21 without altering the signals, but while making a copy and sending these copies to the POS proxy module 121.

Thus, the link between the POS module 21 and the scanner 22 via the scanner driver 23 appears unchanged from the point of view of the POS module 21, the scanner 22 and the scanner driver 23. However, the scanner pass-through driver 123 intercepts signals sent between the POS module 21 and the scanner driver 23, and sends copies of these signals to the POS proxy module 121.

The POS proxy module 121 operates to extract information from these signals to effect customer ratings collection. The information extracted is used both to identify when a customer ratings collection session should start and also to assemble transaction details that may be appended to a rating submitted by a customer.

As can be seen from FIG. 2, the POS proxy module 121 is connected to the card payment system 30. Specifically, the POS proxy module 121 supplies signals to the card payment system. The card payment system 30 is provided with a payment application plug-in 132 that operates in conjunction with the payment application 32. The payment application plug-in provides additional functionality to the payment application 32. For example, the payment application plug-in 132 monitors the card payment system 30 for receipt of signals from the POS proxy module 121, and processes these signals when they arrive. The payment application module 132 also works with the payment application 32 to control the PED 31. Specifically, the payment application plug-in 132 causes the PED 31 to display prompts to the customer to provide a rating, and then monitors the PED 31 for a response. When a rating is provided via the PED 31, the payment application plug-in 132 collects the rating, combines it with information relating to the transaction sent to the payment application plug-in 132 by the POS proxy module 121. The payment application plug-in 132 sends the combined rating and transaction information to a ratings server 150 that collects ratings from multiple sources, analyses the ratings and presents the analysis for review.

Figure 3:
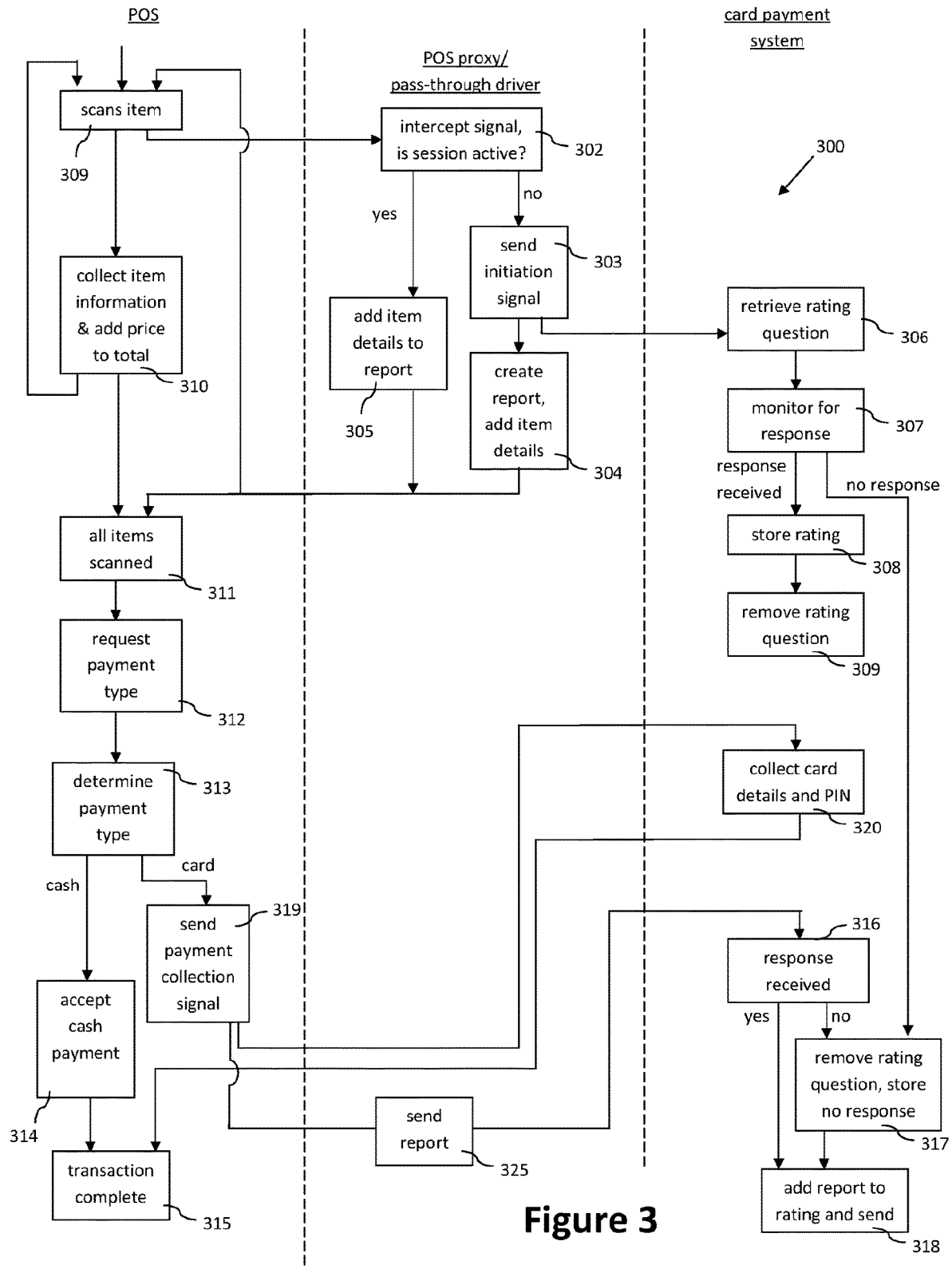
FIG. 3 is a schematic representation of a method of collecting customer ratings in accordance with an embodiment of the present invention.

A method of operation of the system 100 of FIG. 2 will now be described with reference to FIG. 3.

The method 300 starts at 301 when the scanner 22 scans a merchandise item and sends a signal to the POS module 21 via the scanner driver 23. The signal is received by the POS module 21 that, at 310, collects information relating to the scanned item and adds the price of the item to the transaction total. The signal leaving the scanner driver 23 is intercepted by the scanner pass-through driver 123 at 302, and is copied and sent to the POS proxy module 121. Upon receipt of a copied signal from the scanner pass-through driver 123, the POS proxy module 121 first checks to determine if a customer rating session is already active.

If a session is not active, the method 300 proceeds to step 303 where a customer rating session initiation signal is sent to the card payment system 30, and then to step 304 where the POS proxy module 121 creates a transaction report, extracts information relating to the scanned item and adds it to the transaction report. If a session was found to be active, the method 300 instead proceeds to 305 where the POS proxy module 121 just extracts information relating to the scanned item and adds it to the current transaction report.

Where a session was not active, the customer rating session initiation signal sent at 303 is detected by the payment application plug-in 132 at 306, which causes the payment application plug-in 132 to retrieve a rating question from the ratings server 150. Alternatively, a ratings question may be retrieved from a local store of such questions. The question may be "Please rate the service you have received, 0=bad to 9=good", "Please rate the food, 0=bad to 9=good" or "Please rate the quality of the goods you have purchased, 0=bad to 9=good". A selection of questions is held for each retail location that is appropriate to that retail location. Once the rating question has been retrieved, the payment application plug-in 121 commands the PED 31 to display the question. At 307, the payment application plug-in 132 monitors the PED 31 for a response. If a response is detected, the payment application plug-in 132 stores the rating at 308. Once the rating is recorded at 308, the payment application plug-in 132 removes the rating question from the PED 31 at 309. The payment application plug-in 132 may cause the PED 31 to display a new message like "thank you for your rating". The customer may be allowed to decline providing a rating, for example by selecting a "cancel" button, in which case this response is recorded at 309. If no response is received, the rating question will eventually be removed from the PED 31, as explained below.

While the payment application plug-in 132 gathers the rating from the customer, the transaction continues in parallel according to the method 300. That is, further merchandise may be scanned. Where the merchandise is being scanned, this method advantageously uses the dwell time where the customer is waiting for the sales assistant to scan all the items to elicit a rating from the customer. During the dwell time, the customer typically waits by the PED 31 and so the dwell time presents a convenient time to prompt the customer for a rating where the take up rate is significantly higher than asking for a rating to be provided at a later time.

Furthermore, the rating will then be provided at the time of the transaction where the recollection of the customer is at its best, rather than using subsequent ratings that are fallible to the imperfect recollection of customers.

As indicated by the arrows extending out from steps 304 and 305, the method 300 loops back to step 301 where the next item is scanned. The method 300 then continues through steps 302 and 305 as described before.

Eventually all merchandise will be scanned and payment may then be collected. This is detected at 311 where the POS module 21 detects that payment should be taken. Then, at 312, the POS module 21 requests an indication of the payment type, and then determines the payment type at 313 by monitoring for a response.

If a cash payment is indicated, the method 300 continues to 314 where the cash payment is accepted. This causes the POS system 20 to complete the transaction, as shown at 315. This is also detected by the POS proxy module 121 that sends the transaction report to the payment application plug-in 132 as indicated at 325. This prompts the payment application plug-in 132 to determine whether a response to the rating question was received, as shown at 316. If no response was received, the payment application plug-in 132 removes the rating question from the PED 31 and stores a "no response" rating, as shown at 317. The method 300 then proceeds to step 318 where the payment application plug-in 132 adds the transaction report to the rating and sends the combined rating and report to the ratings server 150. If step 316 determines that a rating was provided, the method 300 proceeds directly to step 318 where the stored rating is retrieved, added to the transaction report and sent to the ratings server 150.

Returning to step 313, if the transaction type is determined to be a card payment, the method proceeds to step 319 where the POS module 21 sends a payment collection signal to the card payment system 30. This signal is detected by the payment application plug-in 132 that requests the POS proxy module 121 to send the transaction report at 315. The method then continues through steps 316 to 318 as previously described in respect of cash payments. The payment collection signal received by card payment system 30 also causes the payment application 32 to effect the card transaction at step 320. A delay may be included to ensure the parallel process completes at 317 where any remaining rating question is removed from the PED 31, or a step may be added where the payment application plug-in 132 monitors and confirms when the rating question is not on the PED 31 and only allows the payment application 32 to continue to step 320 when the question is not present.

At step 320, the payment application 32 collects the card details and PIN from the customer in conventional fashion. Once these details have been collected, the transaction is authorised or declined as already described, and a signal sent to the POS module 21 such that the transaction may complete at 315.

Figure 4:
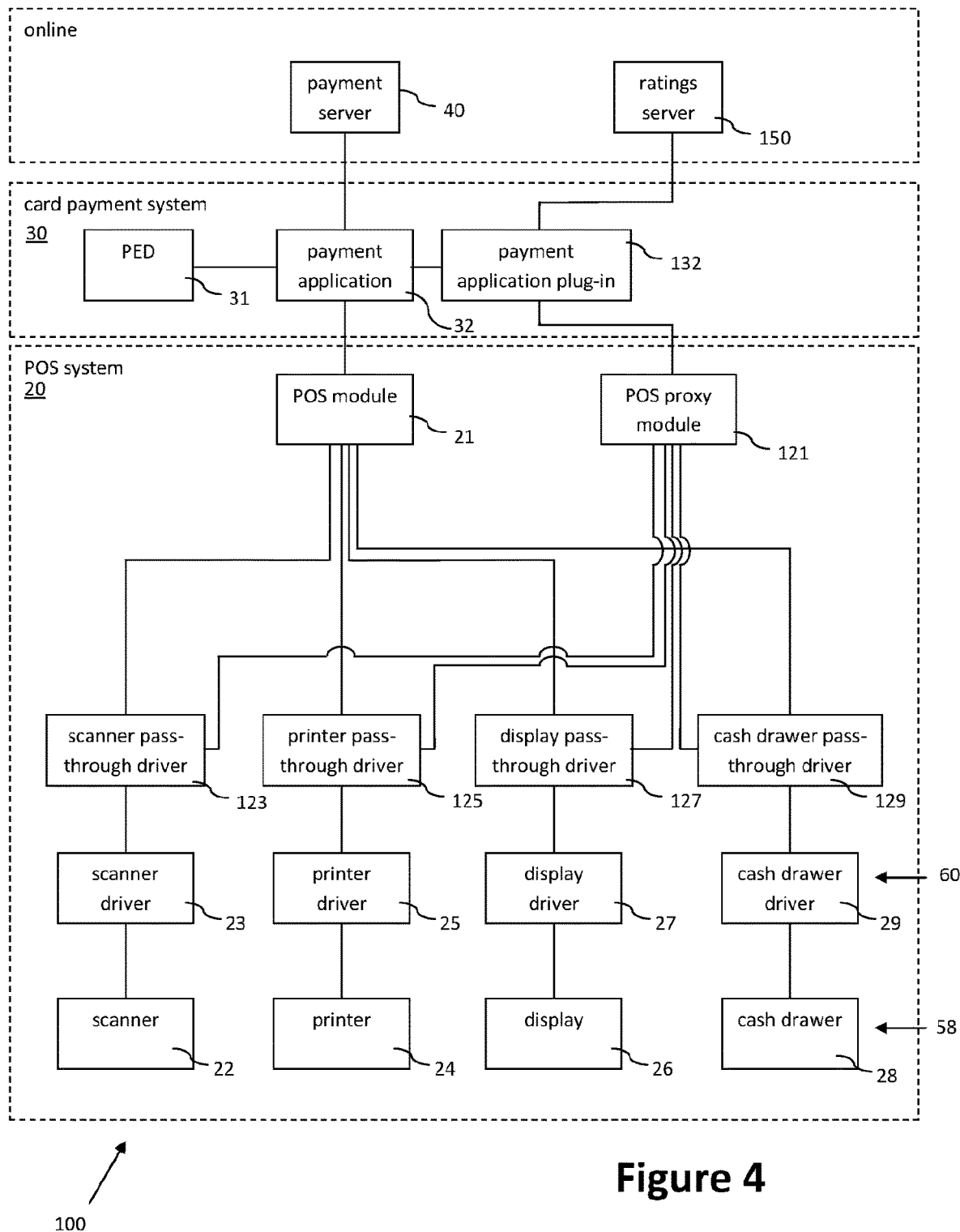
FIG. 4 is a schematic representation of a system operable to collect customer ratings during a transaction according to a further embodiment of the present invention.

FIG. 4 corresponds to a further embodiment of the present invention. The figure shows a system operable to gather customer ratings during a transaction as implemented in a more advanced form. Many of the features shown in FIG. 4 correspond to those shown in FIG. 2, and these features function in the same way. Thus, these features are identified using the same reference numeral and will not be described again.

In addition to the scanner 22, the POS system 20 further comprises a printer 24, a display 26 and a cash drawer 28 akin to the POS system 20 shown in FIG. 1. Each of these peripheral devices 58 has an associated driver 60, namely scanner driver 23, printer driver 25, display driver 27 and cash drawer driver 29. FIG. 2 shows a scanner pass-through driver 123 that resides between the POS module 21 and the scanner driver 23. FIG. 4 shows a pass-through driver 160 provided for each of the peripheral devices 58, namely a printer pass-through driver 125, a display pass-through driver 127 and a cash drawer pass-through driver 129. Each pass-through driver resides between the POS module 21 and its associated driver, and functions in the same way as the scanner pass-through driver 123. That is, each pass-through driver 160 receives signals from the POS module 21 that are directed to the associated scanner driver 60. Each pass-through driver 160 conveys these signals to the associated driver 60 unaltered such that each pass-through driver 160 is effectively transparent to its associated driver 60 and associated peripheral device 58. However, each pass-through driver 160 also copies the signals and sends a copy of the signals to the POS proxy module 121. Similarly, each pass-through driver 160 also forwards signals from the associated driver 60 to the POS module 21 without altering the signals, but while making a copy and sending these copies to the POS proxy module 121.

The signals sent to the POS proxy module 121 may be used in various ways, as will now be described.

1. Scanner pass-through driver 123: first detection of a scan signal may be used to initiate a customer rating session, as explained above with respect to FIG. 3.
2. Scanner pass-through driver 123: each detection of a scan signal may be used to extract information regarding the merchandise item, including description and price, to be included in the transaction report and as explained above with respect to FIG. 3.
3. Printer pass-through driver 125: detection of a printer signal may be used to initiate a customer rating session, if a customer rating session not already active. Printer signals are generally sent when a receipt is to be printed and so indicate the end of a transaction is imminent, but this still presents an opportunity to gather a customer rating. As a receipt is being printed, the PED 31 will have already collected the card details and PIN, so the PED display will be available to display rating question.
4. Printer pass-through driver 125: detection of a printer signal may be used to extract information regarding all merchandise items scanned to be included in the transaction report. This is possible as the POS module 21 will send a series of signals to the printer 24 to correspond to the line by line printing of the receipt, each line containing an item description and price. This series of signals may be used to provide the information to be included in the transaction report. If this information has already been collected, for example using scanner signals or display signals, the printer signals may be used as a cross-check to ensure all items have been recorded. Moreover, further information may be collected from the printer signals for inclusion in the transaction receipt, for example discounts applied or loyalty cards used.
5. Display pass-through driver 127: first detection of a display signal may be used to initiate a customer rating session, if a customer rating session is not already active. Display signals are generally sent after each item is scanned and so allow a customer rating to be obtained during the dwell time when a customer is waiting for their shopping to be scanned, as described with respect to FIG. 3.

6. Display pass-through driver 127: each detection of a display signal may be used to extract information regarding merchandise item, including description and price, to be included in transaction report. Display signals are generally sent after each item is scanned and so allow a customer rating to be obtained during the dwell time, as described with respect to FIG. 3.
7. Cash drawer pass-through driver 129: detection of a cash drawer signal may be used to initiate a customer rating session, if a customer rating session not already active. Cash drawer signals are generally sent when the end of a transaction is imminent, but this still presents an opportunity to gather a customer rating. As the cash drawer is being opened, the PED 31 will have already collected any card details and PIN, so the PED display will be available to display a rating question. Cash drawer signals do not carry any information regarding the transaction itself, and so another signal should be used if information about the transaction is required for inclusion in a transaction report.

As will be appreciated, using all the pass-through drivers 160 and using the signals they produce in all the ways described above provides a level of redundancy that may not be required. Therefore, not all of the items above need be implemented and any combination of items may be used in accordance with the present invention.

In addition, a further possibility is for the payment application plug-in 132 to monitor for a payment request signal. If the card payment system 30 receives a card payment request signal, the payment application plug-in 132 may initiate a customer ratings session, as described before. This may be used in conjunction with any of the items above and with any combination of the items above.

By further way of illustration, FIG. 5 shows a further embodiment of a method of collecting customer ratings 500. Many steps are the same as in FIG. 3, and so like reference numerals are used for like steps.

The method 500 starts at 301 when the scanner 22 scans a merchandise item and sends a scanner signal to the POS module 21 via the scanner driver 23. The scanner signal is received by the POS module 21 that, at 310, collects information relating to the scanned item and adds the price of the item to the transaction total. In this embodiment, the scanner signal leaving the scanner driver 23 is not intercepted by a scanner pass-through driver 123.

The method 300 may continue through loop 501 multiple times that indicates multiple merchandise items may be scanned at step 301. Eventually all merchandise will be scanned and payment may then be collected. This is detected at 311 where the POS module 21 detects that payment should be taken. Then, at 312, the POS module 21 requests an indication of the payment type, and then determines the payment type at 313 by monitoring for a response. If a cash payment is indicated, the method 300 continues to 314 where the cash payment is accepted. The POS module 21 will then prepare to print a receipt as will be explained below. If the transaction type is determined to be a card payment, the method proceeds to step 319 where the POS module 21 sends a payment collection signal to the card payment system 30. The payment collection signal received by card payment system 30 causes the payment application 32 to effect the card transaction at step 320. At step 320, the payment application 32 collects the card details and PIN from the customer in conventional fashion. Once these details have been collected, the transaction is authorised or declined as already described, and a signal sent to the POS module 21 such that POS module 21 may prepare a receipt for printing.

At 502, the POS module 21 generates a series of printer signals corresponding to the lines of text to be printed on the receipt. Therefore, the method 500 loops as indicated at 503 to allow the receipt to be printed line by line. The printer signals sent by the POS module 21 are intercepted by the printer pass-through driver 125 at 302, and are copied and sent to the POS proxy module 121. Upon receipt of a copied printer signal from the printer pass-through driver 125, the POS proxy module 121 first checks to determine if a customer rating session is already active.

If a session is not active, the method 300 proceeds to 303 where a customer rating session initiation signal is sent to the card payment system 30, and then to 304 where the POS proxy module 121 creates a transaction report, extracts information relating to the scanned item and adds it to the transaction report (assuming the printer signal is for printing an item description and price: if not, the signal is ignored at step 304). If a session was found to be active, the method 300 instead proceeds to 305 where the POS proxy module 121 just extracts information relating to the scanned item and adds it to the current transaction report (again assuming the printer signal is for printing an item description and price: if not, the signal is ignored at step 305).

Where a session was not active, the customer rating session initiation signal sent at 303 is detected by the payment application plug-in 132 at 306. This causes the payment application plug-in 132 to retrieve a rating question from the ratings server 150 or, alternatively, to retrieve a ratings question from a local store of such questions, as was previously described with respect to FIG. 3. Once the rating question has been retrieved, the payment application plug-in 121 commands the PED 31 to display the question. At 307, the payment application plug-in 132 monitors the PED 31 for a response. If a response is detected, the payment application plug-in 132 stores the rating at 308. Once the rating is recorded at 308, the payment application plug-in 132 removes the rating question from the PED 31 at 309. The payment application plug-in 132 may cause the PED 31 to display a new message like "thank you for your rating". The customer may be allowed to decline providing a rating, for example by selecting a "cancel" button, in which case this response is recorded at 309. If no response is received, the rating question will eventually be removed from the PED 31, as explained below.

Eventually, the receipt will be complete as indicated at 504. The printer pass-through driver 125 will detect a printer signal indicating this, for example a printer signal sent from the POS module 21 to put the printer into an inactive state. When such a printer signal is detected by the POS proxy module 121, the POS proxy module 121 sends the transaction report to the payment application plug-in 132 as shown at 325. This prompts the payment application plug-in 132 to determine whether a response to the rating question was received, as shown at 316. If no response was received, the payment application plug-in 132 removes the rating question from the PED 31 and stores a no response rating, as shown at 317. The method 300 then proceeds to step 318 where the payment application plug-in 132 adds the transaction report to the rating and sends the combined rating and report to the ratings server 150. If step 316 determines that a rating was provided, the method 300 proceeds directly to step 318 where the stored rating is retrieved, added to the transaction report and sent to the ratings server 150.

Once the receipt is printed, the POS system 20 completes the transaction at 315.

Those skilled in the art will appreciate that variations may be made to the above embodiments without departing from the scope of the invention that is defined by the appended claims.

In the above arrangements, the scanner 22 is described as scanning bar codes. Other arrangements are possible. For example, the scanner could be an optical scanner to scan QR codes or other types of code used to encode a description of an item and its price. Alternatively, near field arrangements (NFC) may be used such that the scanner is used to scan a rf signal or other wireless signal such as Bluetooth or Beacon signals. Also, the scanner may be linked to an alphanumeric keypad to allow codes to be input manually, for example when a bar code or other code is damaged and cannot be scanned optically. In all these arrangements, a scanner pass-through driver 123 may be used to intercept scanner signals as described above.

The accompanying figures show the pass-through drivers 160 to reside between the POS module 21 and the drivers 60. However, arrangements are possible where the pass-through drivers 160 reside between the drivers 60 and the peripheral devices 58, i.e. on the other sides of the drivers 60.

While the above embodiments disclose asking only a single rating question and collecting only a single rating, embodiments are possible where more than a single rating question is asked and more than a single rating gathered. For example, a series of rating questions may be asked, with each question being asked and the rating being collected as described above. Furthermore, provision may be made for a customer to correct a rating.

As has been noted above, the present invention may work with both card-in-machine transactions and contactless transactions. In fact, the present invention may work with any payment type, including cash transactions, coupon transactions and cheque transactions.

The POS proxy module 121 may be used to print messages on the receipt by using the printer pass-through driver 125 to command the printer 24 to add messages to the receipt. For example, a message may be added either to thank the customer for providing a rating or to say sorry that the customer did not provide a rating this time. If a customer does not provide a rating, the POS proxy module 121 may use the printer pass-through driver 125 to command the printer 24 to add a QR code to the receipt with a message to provide a rating at a later time by following the link provided by the QR code. In addition to the web link, the QR code may be encoded to contain the transaction report or a pointer or address in a database from where the transaction report may be retrieved (the payment application plug-in 132 sends the transaction report to the ratings server 150 which may save the transaction report even if no rating is provided).

The invention claimed is:

1. A system operable to collect customer ratings during a transaction, the system comprising:
    an electronic point of sale system comprising:
        a scanner operable to read encoded information relating to merchandise to be purchased as part of the transaction;
        a computer programmed to effect operation of the electronic point of sale system and including
            a POS module programmed to manage operation of the scanner,
            a scanner driver operable to convey scanner signals between the POS module and the scanner wherein the scanner signals include merchandise signals providing information of merchandise just scanned,
        a PIN entry device operable in association with the electronic point of sale to arrange a card payment for the transaction;
        a payment application operable to manage operation of the PIN entry device, and programmed to receive a payment collection signal from the POS module, to operate the PIN entry device to collect card details including a PIN from the customer to effect payment of the transaction and to provide a payment confirmation signal to the POS module to confirm whether or not a payment was successfully made using the PIN entry device;
        a POS proxy module arranged to work in parallel with the POS module;
        a payment application plug-in operable in conjunction with the payment application and arranged to work in parallel with the payment application, wherein the payment application plug-in is configured to receive one or more rating questions from a remote ratings server;
        a scanner pass-through driver operable to pass the scanner signals between the POS module and the scanner while collecting information from the scanner signals and sending copies of that information to the POS proxy module;
        wherein the POS proxy module is programmed to process the received information from the scanner pass-through driver (a) to initiate a customer rating collection session upon the first receipt and detection, after a start and before completion of processing of the payment application; (b) to send a customer rating initiation signal to the payment application plug-in, and wherein the payment application plug-in is programmed to cause the PIN entry device to display a question on the PIN entry device prompting the customer to enter a rating, and to collect the rating entered by the customer; (c) to extract product information, including at least a description and a price, (d) to combine said product information with consumer rating entered by the consumer into a transaction payment report; and (e) to transmit the combined transaction payment report to the remote ratings server;
        wherein the POS proxy module and the payment application plug-in are programmed to operate in parallel with the payment application and the POS module, the POS proxy module and the payment application plug-in completing the customer rating collection session after the start and before completion of processing of the payment application, during dwell time of the scanner processing, and wherein said system avoids a software update to the PIN entry device, the POS module and the payment application components in order to implement the customer rating collection processing and updates to the customer rating collection processing that are shared and combined with the payment application data into one or more transaction payment reports.

2. The system of claim 1, wherein the POS proxy module is programmed to collate information collected from merchandise signals by the scanner pass-through driver into a transaction report, and wherein the POS proxy module and the payment application plug-in are programmed to share and combine the rating and the transaction report.

3. The system of claim 2, wherein the POS proxy module is programmed to send the transaction report to the payment application plug-in and wherein the application payment plug-in is programmed to combine the rating and the transaction report and, optionally, to send the combined rating and transaction report to a remote ratings server.

4. The system of claim 1, wherein:
the electronic point of sale further comprises a printer operable to print receipts relating to the transaction,
the POS module is programmed to manage operation of the scanner and the printer,
the computer includes a printer driver operable to convey printer signals between the POS module and the printer wherein the printer signals include a transaction summary signal, and
the system comprises a printer pass-through driver operable to pass the printer signals between the POS module and the printer while passing the printer signals to the POS proxy module,
wherein the POS module and transaction application process the financial transaction data only, in parallel with the POS proxy module and the payment application plug-in, without processing the rating questions from the remote ratings server and user responses to the rating questions.

5. The system of claim 4, wherein the POS proxy module is programmed to generate a rating confirmation message relating to whether or not a rating was provided, and to send the rating confirmation message to the printer pass-through driver and the printer pass-through driver is operable to forward the rating confirmation message to the printer such that the rating confirmation message is appended to a receipt printed by the printer in respect of the transaction.

6. The system of claim 4, wherein the POS proxy module is further programmed to collect the customer rating during the transaction by using the printer signal received from the printer pass-through driver to initiate the customer rating collection session.

7. The system of claim 4, wherein the POS proxy module is programmed to collate information collected from merchandise signals by the scanner pass-through driver into a transaction report, and wherein the POS proxy module and the payment application plug-in are programmed to share and combine the rating and the transaction report, and wherein the printer pass-through driver is programmed to collect information from the transaction summary signal and to send that information to the POS proxy module, and wherein the POS proxy module is programmed to add information received from the printer pass-through driver into the transaction report.

8. The system of claim 1, wherein:
the electronic point of sale further comprises a display operable to display information relating to the transaction to a customer,
the POS module is programmed to manage operation of the scanner and the display,
the computer includes a display driver operable to convey display signals between the POS module and the display wherein the display signals include information of merchandise that has been scanned, and
the system comprises a display pass-through driver operable to pass the display signals between the POS module and the display while also passing the display signals to the POS proxy module,
wherein the POS module and transaction application process the financial transaction data only, in parallel with the POS proxy module and the payment application plug-in, without processing the rating questions from the remote ratings server and user responses to the rating questions.

9. The system of claim 8, wherein the POS proxy module is further programmed to collect the customer rating during the transaction by using the display signal received from the display pass-through driver to initiate the customer rating collection session.

10. The system of claim 8, wherein the POS proxy module is programmed to collate information collected from merchandise signals by the scanner pass-through driver into a transaction report, and wherein the POS proxy module and the payment application plug-in are programmed to share and combine the rating and the transaction report, and wherein the POS proxy module is programmed to collect information of merchandise that has been scanned from the display signal, and to add that information into the transaction report.

11. The system of claim 1, wherein:
the electronic point of sale further comprises a cash drawer providing secure storage of money,
the POS module is programmed to manage operation of the scanner and the cash drawer,
the computer includes a cash drawer driver operable to convey cash drawer signals between the POS module and the cash drawer to open the cash drawer,
the system comprises a cash drawer pass-through driver operable to pass the cash drawer signals between the POS module and the cash drawer while also passing the cash drawer signals to the POS proxy module, and
wherein the POS proxy module is further programmed to collect the customer rating during the transaction by using the cash drawer signal received from the cash drawer pass-through driver to initiate the customer rating collection session, and wherein the POS module and transaction application process the financial transaction data only, in parallel with the POS proxy module and the payment application plug-in, without processing the rating questions from the remote ratings server and user responses to the rating questions.

12. The system of claim 1, wherein the payment application plug-in is programmed to remove the question from the PIN entry device once the customer has provided a rating or once the payment application receives the payment collection signal from the POS module.

13. A method of collecting customer ratings during transactions conducted at a point of sale, the method comprising:
scanning merchandise items using a scanner forming part of an electronic point of sale system;
the scanner providing a POS module of the electronic point of sale system with a scanner signal representative of each scanned item;
intercepting the scanner signals with a scanner pass-through driver, forwarding each scanner signal or a copy thereof to the POS module and forwarding each scanner signal or a copy thereof to a POS proxy module, arranged to work in parallel with the POS module;
the POS proxy module processing the received information from the scanner pass-through driver (a) to initiate a customer rating sessions and collection of a customer rating in response to receiving a scanner signal or a copy thereof, after a start and before completion of processing of a payment application; (b) sending a customer rating initiation signal to the payment application plug-in, wherein the payment application plug-in is programmed to cause the PIN entry device to display a question on the PIN entry device prompting the customer to enter a rating, and collecting the rating entered by the customer; (c) extracting product information, including at least a description and a price; (d) combining said product information with consumer rating entered by the consumer into a transaction payment report; and (e) transmitting the combined transaction payment report to the remote ratings server;

the payment application plug-in, arranged to work in parallel with the payment application, wherein the payment application plug-in is configured to receive one or more rating questions from a remote ratings server;

causing a PIN entry device to display a question prompting the customer to enter a rating wherein the PIN entry device operates under the control of a payment application, and collecting the rating when entered by the customer, wherein the POS proxy module and the payment application plug-in are programmed to operate in parallel with the payment application and the POS module, the POS proxy module and the payment application plug-in completing the customer rating collection session after the start and before completion of processing of the payment application, during dwell time of the scanner processing, said system avoiding software update to the PIN entry device, the POS module and the payment application components in order to implement the customer rating collection processing and updates to the customer rating collection processing that are shared and combined with the payment application data into one or more transaction payment reports.

14. The method of claim 13, comprising the POS module sending a payment collection signal to the payment application, the payment application controlling the PIN entry device to collect information necessary to complete a card payment.

15. The method of claim 14, comprising the payment application causing the question prompting the customer to enter a rating to be removed from the PIN entry device before prompting the customer to provide the information necessary to complete a card payment.

16. The method of claim 13, wherein upon receiving a scanner signal or a copy thereof from the scanner pass-through driver, the POS proxy module determines whether or not a customer rating session is active and, if not, initiates collection of a customer rating by sending the customer rating initiation signal to the payment application plug-in.

17. The method of claim 13, comprising the POS proxy module collating information regarding the merchandise items scanned from the scanner signals or copies thereof received into a transaction report, and the method further comprising combining the rating and the transaction report while the POS module and transaction application process the financial transaction data only, in parallel with the POS proxy module and the payment application plug-in, without processing the rating questions from the remote ratings server and user responses to the rating questions.

18. The method of claim 13, comprising the POS module sending printer signals to a printer of the electronic point of sale system, intercepting the printer signals with a printer pass-through driver, and forwarding each printer signal or a copy thereof to the POS proxy module.

19. The method of claim 18, comprising the POS proxy module generating a rating confirmation message relating to whether or not a rating was provided and sending the rating confirmation message to the printer pass-through driver, and the printer pass-through driver forwarding the rating confirmation message to the printer such that the rating confirmation message is appended to a receipt printed by the printer in respect of the transaction.

20. The method of claim 18, comprising the POS proxy module causing collection of the customer rating during the transaction by using the printer signal or the copy thereof received from the printer pass-through driver to initiate the customer rating collection session.

21. The method of claim 18, comprising the POS proxy module collating information regarding the merchandise items scanned from the scanner signals or copies thereof received into a transaction report, the printer pass-through driver collecting information regarding the merchandise items from a transaction summary signal sent to the printer for generating a receipt and sending that information to the POS proxy module, the POS proxy module adding information received from the printer pass-through driver into the transaction report, and combining the rating and the transaction report, while the POS module and transaction application process the financial transaction data only, in parallel with the POS proxy module and the payment application plug-in, without processing the rating questions from the remote ratings server and user responses to the rating questions.

22. The method of claim 13, comprising the POS module sending display signals to a display of the electronic point of sale system, intercepting the display signals with a display pass-through driver, and forwarding each display signal or a copy thereof to the POS proxy module.

23. The method of claim 13, comprising the POS module sending cash drawer signals to a cash drawer of the electronic point of sale system, intercepting the cash drawer signals with a cash drawer pass-through driver, and forwarding each cash drawer signal or a copy thereof to the POS proxy module, and the POS proxy module causing collection of the customer rating during the transaction by using the cash drawer signal or the copy thereof received from the cash drawer pass-through driver to initiate the customer rating collection session.

24. A system operable to collect customer ratings during a transaction, the system comprising:
an electronic point of sale system comprising:
a printer operable to print receipts relating to a transaction;
a computer programmed to effect operation of the electronic point of sale system and including
a POS module programmed to manage operation of the printer,
a printer driver operable to convey printer signals between the POS module and the printer wherein the printer signals include a transaction summary signal,
a PIN entry device operable in association with the electronic point of sale to arrange a card payment for the transaction;
a payment application operable to manage operation of the PIN entry device, and programmed to receive a payment collection signal from the POS module, to operate the PIN entry device to collect card details including a PIN from the customer to effect payment of the transaction and to provide a payment confirmation signal to the POS module to confirm whether or not a payment was successfully made using the PIN entry device;
a POS proxy module arranged to work in parallel with the POS module;

a payment application plug-in operable in conjunction with the payment application and arranged to work in parallel with the payment application of the POS module, wherein the payment application plug-in is configured to receive one or more rating questions from a remote ratings server;

a printer pass-through driver operable to pass the printer signals between the POS module and the printer while passing the copies of the printer signals to the POS proxy module;

wherein the POS proxy module is programmed to process the received information from the scanner pass-through driver (a) to initiate the customer rating collection session upon the first receipt and detection, after a start and before completion of processing of the payment application; (b), to send a customer rating initiation signal to the payment application plug-in, and wherein the payment application plug-in is programmed to cause the PIN entry device to display a question on the PIN entry device prompting the customer to enter a rating, and to collect the rating entered by the customer; (c) to extract product information, including at least a description and a price; (d) to combine said product information with consumer rating entered by the consumer into a transaction payment report; and (e) to transmit the combined transaction payment report to the remote ratings server;

wherein the POS proxy module and the payment application plug-in are programmed to operate in parallel with the payment application and the POS module, the POS proxy module and the payment application plug-in completing the customer rating collection session after the start and before completion of processing of the payment application during dwell time of the scanner processing, and wherein said system avoids a software update to the PIN entry device, the POS module and the payment application components in order to implement the customer rating collection processing and updates to the customer rating collection processing that are shared and combined with the payment application data-into one or more transaction payment reports.

25. A system operable to collect customer ratings during a transaction, the system comprising:

an electronic point of sale system comprising:
  a display operable to display information relating to the transaction to a customer;
  a computer programmed to effect operation of the electronic point of sale system and including
    a POS module programmed to manage operation of the display,
    a display driver operable to convey display signals between the POS module and the display wherein the display signals include information of merchandise that has been scanned,
  a PIN entry device operable in association with the electronic point of sale to arrange a card payment for the transaction;
a payment application operable to manage operation of the PIN entry device, and programmed to receive a payment collection signal from the POS module, to operate the PIN entry device to collect card details including a PIN from the customer to effect payment of the transaction and to provide a payment confirmation signal to the POS module to confirm whether or not a payment was successfully made using the PIN entry device;

a POS proxy module arranged to work in parallel with the POS module;

a payment application plug-in operable in conjunction with the payment application and arranged to work in parallel with the payment application of the POS module, wherein the payment application plug-in is configured to receive one or more rating questions from a remote ratings server;

a display pass-through driver operable to pass the display signals between the POS module and the display while also passing the copies of the display signals to the POS proxy module;

wherein the POS proxy module is programmed to process the received information from the scanner pass-through driver (a) to initiate the customer rating collection session upon the first receipt and detection, after a start and before completion of processing of the payment application; (b), to send a customer rating initiation signal to the payment application plug-in, and wherein the payment application plug-in is programmed to cause the PIN entry device to display a question on the PIN entry device prompting the customer to enter a rating, and to collect the rating entered by the customer; (c) to extract product information, including at least a description and a price; (d) to combine said product information with consumer rating entered by the consumer into a transaction payment report; and (e) to transmit the combined transaction payment report to the remote ratings server;

wherein the POS proxy module and the payment application plug-in are programmed to operate in parallel with the payment application and the POS module, the POS proxy module and the payment application plug-in completing the customer rating collection session after the start and before completion of processing of the payment application, during dwell time of the scanner processing, and wherein said system avoids a software update to the PIN entry device, the POS module and the payment application components in order to implement the customer rating collection processing and updates to the customer rating collection processing that are shared and combined with the payment application data into one or more transaction payment reports.

26. A system operable to collect customer ratings during a transaction, the system comprising:

an electronic point of sale system comprising:
  a cash drawer providing secure storage of money;
  a computer programmed to effect operation of the electronic point of sale system and including
    a POS module programmed to manage operation of the cash drawer,
    a cash drawer driver operable to convey cash drawer signals between the POS module and the cash drawer to open the cash drawer,
  a PIN entry device operable in association with the electronic point of sale to arrange a card payment for the transaction;
a payment application operable to manage operation of the PIN entry device, and programmed to receive a payment collection signal from the POS module, to operate the PIN entry device to collect card details including a PIN from the customer to effect payment of the transaction and to provide a payment confirmation signal to the POS module to confirm whether or not a payment was successfully made using the PIN entry device;

a POS proxy module arranged to work in parallel with the POS module, wherein the payment application plug-in is configured to receive one or more rating questions from a remote ratings server;

a payment application plug-in operable in conjunction with the payment application and arranged to work in parallel with the payment application of the POS module, wherein the payment application plug-in is configured to receive one or more rating questions from a remote ratings server;

a cash drawer pass-through driver operable to pass the cash drawer signals between the POS module and the cash drawer while also passing the copies of the cash drawer signals to the POS proxy module;

wherein the POS proxy module is programmed to process the received information from the scanner pass-through driver (a) to initiate the customer rating collection session upon the first receipt and detection, after a start and before completion of processing of the payment application; (b), to send a customer rating initiation signal to the payment application plug-in, and wherein the payment application plug-in is programmed to cause the PIN entry device to display a question on the PIN entry device prompting the customer to enter a rating, and to collect the rating entered by the customer; (c) to extract product information, including at least a description and a price; (d) to combine said product information with consumer rating entered by the consumer into a transaction payment report; and (e) to transmit the combined transaction payment report to the remote ratings server;

wherein the POS proxy module and the payment application plug-in are programmed to operate in parallel with the payment application and the POS module, the POS proxy module and the payment application plug-in completing the customer rating collection session after the start and before completion of processing of the payment application during dwell time of the scanner processing, and wherein said system avoids a software update to the PIN entry device, the POS module and the payment application components in order to implement the customer rating collection processing and updates to the customer rating collection processing that are shared and combined with the payment application data into one or more transaction payment reports.

27. The system of claim 1, further comprising a printer driver for send and receive a second consumer rating initiation signal if the scanner pass-through driver is not operational.

28. The system of claim 1, wherein the scanner pass-through is utilized for receiving one or more of the payment collection, card details, payment transaction and payment confirmation signals, and further configured to initiate the consumer rating processing, and further comprising a display interface for receiving and processing of the consumer ratings, after the initiation by the scanner pass-through.

29. The system of claim 1, wherein the payment application plug-in removes each question displayed on the PIN entry device once the customer enters the requested consumer rating.

30. The system of claim 1, wherein the dwell time of the scanner is when one or more purchase items of a purchaser are being scanned.

31. The method of claim 13, wherein the dwell time of the scanner is determined as a time interval when one or more purchase items of a purchaser are being scanned.

* * * * *